(12) United States Patent
Bartolutti et al.

(10) Patent No.: US 6,522,737 B1
(45) Date of Patent: Feb. 18, 2003

(54) SYSTEM AND METHOD OF OPERATION FOR A TELECOMMUNICATIONS PATCH SYSTEM

(75) Inventors: Stephen Craig Bartolutti, Suwanee, GA (US); Golam Mabud Choudhury, Warren Township, Somerset County, NJ (US); Michael Gregory German, Secaucus, NJ (US); Daniel Warren Macauley, Fishers, IN (US); Lawrence Marc Paul, Randolph, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,614

(22) Filed: Feb. 10, 1999

(51) Int. Cl.[7] .................................................. H04M 1/24
(52) U.S. Cl. ...................... 379/156; 379/25; 379/27.01; 379/327; 340/825.36; 348/552
(58) Field of Search .............................. 379/24, 25, 26, 379/27.01, 28, 29, 32, 156, 160, 164, 165, 166, 343, 397, 399, 425, 325, 326, 327; 439/43, 332, 669; 361/761, 772, 806; 340/825.36; 348/552

(56) References Cited

U.S. PATENT DOCUMENTS

| | | | | |
|---|---|---|---|---|
| 4,773,867 A | * | 9/1988 | Keller et al. | 439/49 |
| 5,145,380 A | * | 9/1992 | Holcomb et al. | 439/49 |
| 5,161,988 A | * | 11/1992 | Krupka | 439/136 |
| 5,432,847 A | * | 7/1995 | Hill et al. | 379/328 |
| 5,448,675 A | * | 9/1995 | Leone et al. | 385/135 |
| 5,483,467 A | * | 1/1996 | Krupka et al. | 364/550 |
| 5,546,282 A | * | 8/1996 | Hill et al. | 361/796 |
| 5,550,755 A | * | 8/1996 | Martin et al. | 364/514 R |
| 5,764,043 A | * | 6/1998 | Czosnowski et al. | 324/66 |
| 5,821,760 A | * | 10/1998 | Koeman et al. | 324/628 |
| 5,832,071 A | * | 11/1998 | Voelker | 379/165 |
| 5,944,535 A | * | 8/1999 | Bullivant et al. | 439/49 |
| 6,086,415 A | * | 7/2000 | Sanchez et al. | 439/540.1 |
| 6,263,061 B1 | * | 7/2001 | Tanaka et al. | 379/156 |
| 6,330,307 B1 | * | 12/2001 | Bloch et al. | 379/25 |
| 6,350,148 B1 | * | 2/2002 | Bartolutti et al. | 439/489 |
| 6,363,200 B1 | * | 3/2002 | Thompson et al. | 385/135 |
| 6,222,908 B1 | * | 4/2002 | Bartolutti et al. | 379/27 |
| 6,285,293 B1 | * | 9/2002 | German et al. | 340/687 |

FOREIGN PATENT DOCUMENTS

| | | | |
|---|---|---|---|
| EP | 0575100 | 12/1993 | G01R/31/02 |
| GB | 2236398 | 4/1991 | G01R/31/02 |

* cited by examiner

Primary Examiner—Binh Tieu

(57) ABSTRACT

A system and method for ascertaining the status of a telecommunications patching system and communicating that status to a remote location. Each of the patch panels in a telecommunications closet contains connector ports that receive the ends of patch cords. Tracing interface modules mount to the patch panels and provide a sensor for the connector ports. The sensor detects whenever a patch cord is connected to, or removed from, a connector port. A computer controller is connected to the various sensors in each rack to monitor changes to the patch cord interconnections. The computer controllers can be joined together in a network to monitor the status of the connector ports. The data on the network contains the full status of the telecommunications closet. The network can be accessed via a telecommunications network via a modem from a remote computer.

25 Claims, 3 Drawing Sheets

SYSTEM AND METHOD OF OPERATION FOR A TELECOMMUNICATIONS PATCH SYSTEM

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORD IN A DEDICATED TELECOMMUNICATIONS SYSTEM;

U.S. patent application Ser. No. 09/247,269, entitled TRACING INTERFACE MODULE FOR PATCH CORDS IN A TELECOMMUNICATIONS PATCH SYSTEM;

U.S. patent application Ser. No. 09/247,385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09/247,270, entitled METHOD AND DEVICE FOR DETECTING THE PRESENCE OF A PATCH CORD CONNECTOR IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCH SYSTEM USING PASSIVE DETECTION SENSORS;

U.S. patent application Ser. No. 09/404,420, entitled SYSTEM AND METHOD FOR IDENTIFYING SPECIFIC PATCH CORD CONNECTORS IN A TELECOMMUNICATIONS PATCH SYSTEM; and U.S. patent application Ser. No. 09/404,619, entitled SYSTEM AND METHOD OF INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

The present invention relates to the structure and method of operations of dedicated telecommunications patching systems where telecommunications lines are selectively interconnected using patch cords. More particularly, the present invention relates to systems and methods for remotely accessing telecommunication patching systems, prior to physically visiting the telecommunications patching system.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various lines of the patch cords 20, any combination of telecommunications lines can be interconnected.

In many businesses, employees are assigned their own computer network access number exchange so that the employee can interface with the company's main frame computer or computer network. When an employee changes office locations, it is not desirable to provide that employee with new exchange numbers. Rather, to preserve consistency in communications, it is preferred that the exchanges of the telecommunication connection ports in the employee's old office be transferred to the telecommunications ports in the employee's new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between an internal line and an external line. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

Furthermore, each rack on a telecommunications closet only contains a finite amount of room. Accordingly, each rack can hold only a predetermined maximum number of patch panels. The number of connector ports on the various patch panels is also limited. Often a technician does not know if there are any free connector ports in a telecommunications closet until the technician inspects the telecommunications closet. If no free connector ports are available, a technician may have to add a new patch panel to one of the racks in the telecommunications closet. If there is no room for additional patch panels, a new rack may have to be added to the telecommunications closet.

As can be ascertained, a technician often does not know how complicated a task will be in a telecommunication closet until the technician inspects that telecommunications closet and determines the status of that telecommunications closet. Unfortunately, a technician cannot currently inspect a telecommunications closet until such a time that he/she arrives at that telecommunications closet. Accordingly, the unknown status of different telecommunications closets makes it difficult for technicians to generate and keep an accurate work schedule.

Furthermore, technicians are typically given work orders that instruct them as to which patch cords in a telecommunications closet are to be rearranged, removed or added. The records for a telecommunication closets may not be accurately kept. In a telecommunications closet, there are often deadjumpers that are connected to the telecommunications rack but serve no purpose. Without accurate records, a technician cannot tell if a patch cord is active or dead. Accordingly, a technician may add new patch panels to the telecommunication closet when such additions are not necessary.

A need therefore exists in the field of telecommunication patching closets for a system and method of remotely ascertaining the status of a telecommunications closet, prior to the arrival of a technician.

SUMMARY OF THE INVENTION

The present invention is a system and method for ascertaining the status of a telecommunications patching system and making that status communicable to a remote location. The system includes a plurality of tracing interface modules that attach to the patch panels in a telecommunications closet. Each of the patch panels in a telecommunications closet contains a plurality of connector ports that receive the terminated ends of patch cords. The tracing interface modules mount to the patch panels and provide a sensor for each of the connector ports. The sensor detects whenever a patch cord is connected to, or removed from, a connector port. Accordingly, by connecting a computer controller to the various sensors in each rack, the computer controller can monitor all changes to the patch cord interconnections within that rack. The computer controllers can be joined together in a network. The network monitors the status of all the connector ports on all the racks. Accordingly, the data on the network contains the full status of the telecommunications closet.

The network within the telecommunications closet can be accessed via a private and/or public telecommunications network. Accordingly, the network within the telecommunications closet can be accessed, via a modem from a remote computer. Preferably, the network within the telecommunications closet is coded with a Simple Network Management Protocol, the current standard internet protocol. This enables direct access of the network via the internet.

By ascertaining the status of a telecommunications closet before traveling to that telecommunications closet, a technician can predetermine the amount of work that needs to be done to complete a scheduled task. This eliminates the time previously required to manually determine the status of a telecommunications closet on site. Furthermore, paperless work order instruction can be fed directly to the telecommunications closet for a technician to read on-site.

BRIEF DESCRIPTION OF THE DRAWINGS

For a better understanding of the present invention, reference is made to the following description of and exemplary embodiment thereof, considered in conjunction with the accompanying drawings, in which.

DETAILED DESCRIPTION OF THE DRAWINGS

Figure 1:
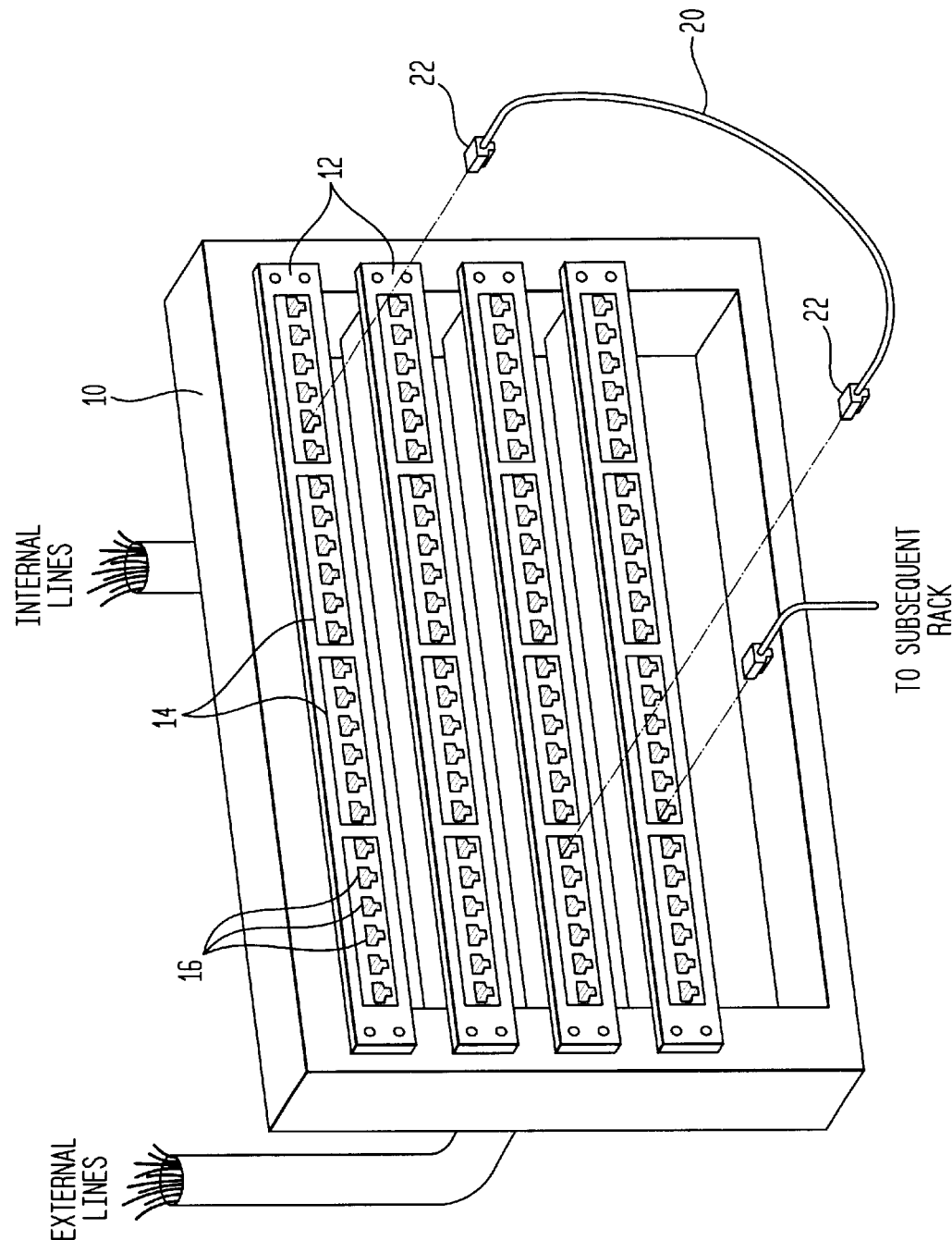
FIG. 1 is a perspective view of a typical prior art telecommunications rack assembly containing multiple patch panels with connector ports that are selectively interconnected by patch cords.
Figure 2:
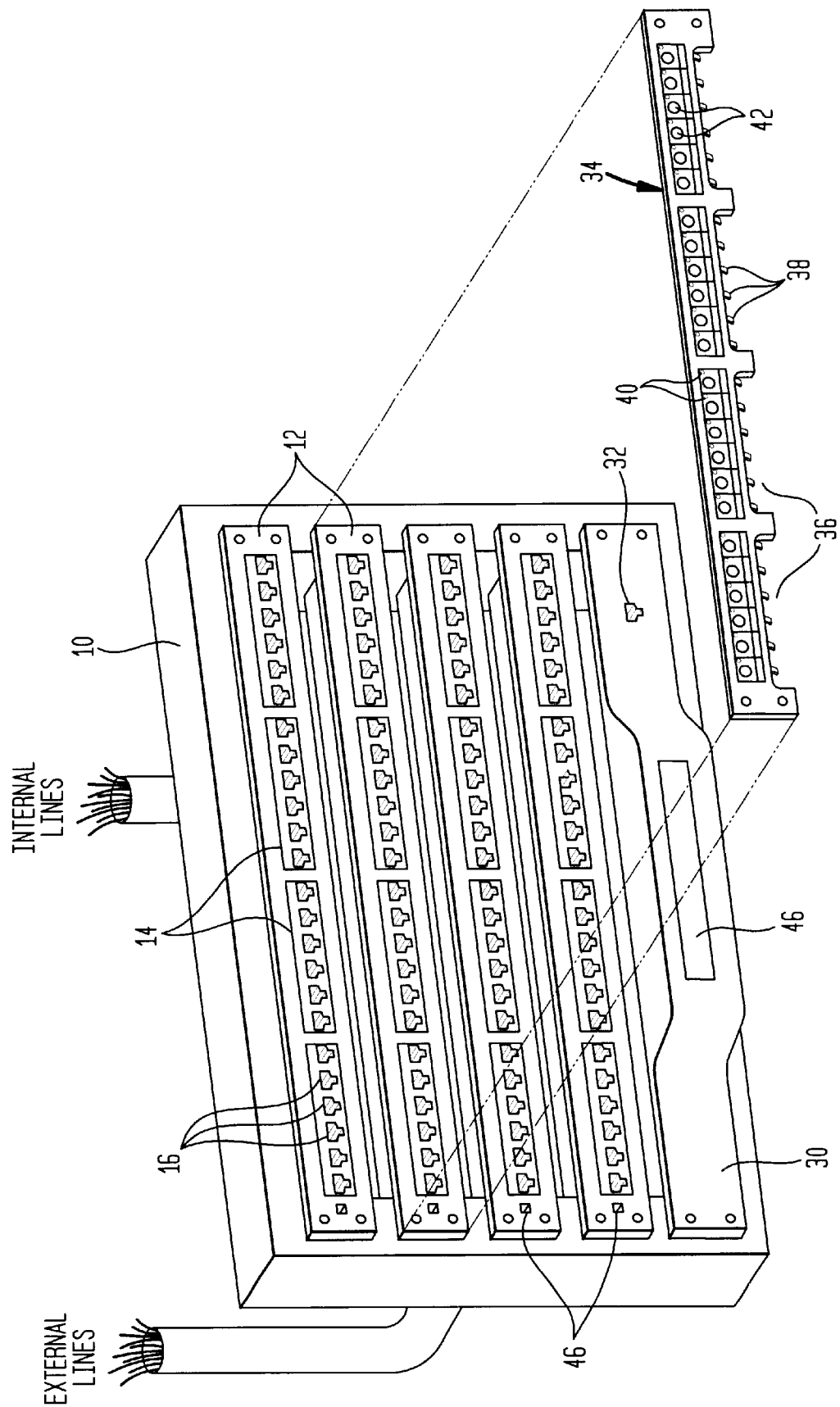
FIG. 2 is a perspective view of a tracing interface module and rack controller in accordance with the present invention, shown in conjunction with the prior art telecommunications rack assembly of FIG. 1.

In the prior art telecommunications rack of FIG. 1, there is no method of determining the status of the individual connector ports present on the various patch panels. In the present invention system and method, each patch panel and rack is modified so that the status of each individual connector port can be monitored by computer. Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various telecommunications lines that lead into the telecommunications closet.

In the present invention system, a rack controller 30 is mounted to each rack 10 in the overall patch system. The rack controller 30 contains a central processing unit (CPU). The CPU is capable of independently running line tracing programs and also contains a remote access port 32 that enables the CPU to be accessed by a remote computer. The purpose of the rack controller 30 is to operate and gather data from various tracing interface modules 34. The tracing interface modules 34 are modules that mount to the face of each patch panel 12 on the rack 10. The tracing interface modules 34 surround the various connector ports 16 located on a patch panel 12 and provide an interface through which data about each connector port can be transmitted to and from the rack controller 30.

The tracing interface module 34 can have multiple different configurations. The structure and different configuration of the tracing modules 34 are disclosed in related co-pending patent application Ser. No. 09/247,269, now issued as U.S. Pat. No. 6,234,830, entitled Tracing Interface Module For Patch Cords In A Telecommunications Patch System; patent application Ser. No. 09/247,385, now issued as U.S. Pat. No. 6,330,307, entitled Display Panel Overlay Structure And Method For Tracing Interface Modules In A Telecommunications System; and patent application Ser. No. 09/247,270, now issued as U.S. Pat. No. 6,350,148, entitled Method And Devices For Detecting The Presence Of A Patch Cord Connector In a Telecommunications Patch System. These applications have already been incorporated into this application by reference.

In the shown embodiment, the tracing interface module 34 contains a rectangular relief 36 that surrounds the connector ports 16 on each patch port assembly 14 when the tracing interface module 34 is connected to the patch panels 12. From FIG. 2, it can be seen that extending into each rectangular relief 36 is a plurality of sensors 38. Each sensor 38 corresponds in position with one of the connector ports 16 on the patch panel 12. As the terminated end of a patch cord 20 (FIG. 1) is connected to a connector port 16, the presence of the patch cord 20 is detected by the rack controller 30. The rack controller 30 is therefore capable of automatically determining when a patch cord 20 has been added to, or removed from, any connector port 16 on the rack 10.

In addition to the sensors, the tracing interface module also contains light emitting diodes (LEDS) 40 and tracing buttons 42 that are used in tracing the origin and destination of each of the patch cords 20. The disclosure concerning patch cord tracing can be found in co-pending U.S. patent application Ser. No. 09/247,613, now issued as U.S. Pat. No. 6,285,293, entitled System and Method For Addressing And Tracing Patch Cords In A Dedicated Telecommunications System, the disclosure of which has previously been incorporated by reference.

When a patch cord 20 (FIG. 1) is placed into any connector port 16, or removed from any connector port 16, that change is sensed by a sensor 38 and read to the rack controller 30. The rack controller 30 is therefore capable of monitoring any and all changes that occur to the patch cords in the patch system over time. The rack controller 30 is therefore also capable of automatically keeping an accurate log of all changes that have occurred to the patch cords since the installation of the present invention system. Accordingly, if a technician is servicing the patch system, that technician can read the accurate log directly from the rack controller 30. The log can be read out on the display 46 of the rack controller 30 or can be remotely accessed via the connector port 32 on the rack controller 30.

Figure 3:
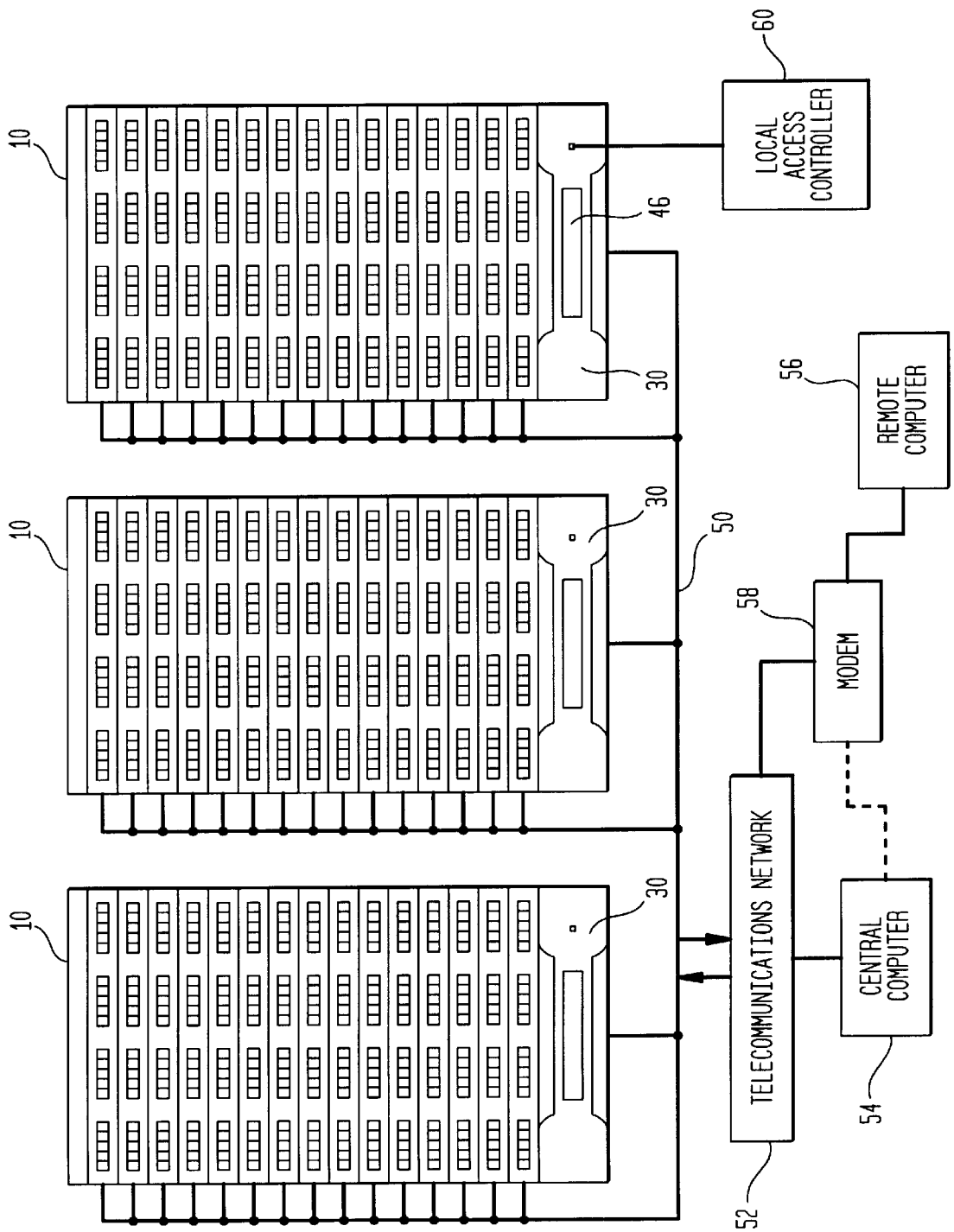
FIG. 3 is a schematic view of the present invention system.

Referring to FIG. 3, it can be seen that the rack controllers 30 of the various racks 10 within a telecommunications closet can be networked together in parallel. This produces a closet control network 50 that monitors the status of every connector port 16 (FIG. 2) within that telecommunications closet. Accordingly, by accessing the closet control network 50, a technician can ascertain the full status of the telecommunications closet, including the status and location of unused connector ports 16 (FIG. 2) within the telecommunications closet and the location of dead patch cords.

A technician can access the closet control network 50 from within the telecommunications closet itself. However, it is useful for the technician to access the closet control network 50 prior to arriving at the telecommunications closet.

As is shown in FIG. 3, the closet control network 50 is connected to either a private or public telecommunications network 52. Using a telecommunications link, a remote computer 56 can access the closet control network 50 and develop a database of data from the closet control network 50. A technician can therefore ascertain the status of the targeted telecommunications closet by accessing the collected data in the database.

Each rack controller 30 may contain the software that is used to organize and display the information gathered from the closet control network 50. However, if a technician has this operating software, a technician can access the closet control network 50 directly, via the private or public telecommunications network 52.

To facilitate the access of the closet control network 50 from remote locations, the closet control network 50 is preferably coded using a Simple Network Management Protocol (SNMP). SNMP is the current standard management protocol for the internet. Accordingly, using the internet, a technician can access the closet control network 50 and can ascertain the status of the selected telecommunications closet.

As a technician arrives at a telecommunications closet to do work, that technician may want to retrieve certain information from the closet control network 50 that may have not been previously retrieved. For this reason, a local access controller 60 may be provided. A local access controller 60 is a hand held controller that communicates to the closet control network 50. The hand held controller can be hard wired to one of the rack controllers 30 (as is shown), or the hand held controller can create a wireless link with a rack controller 30 via infrared or radio signal transmissions. The hand held controller can have its own display, or else it may utilize the display 46 on one of the rack controllers 30 to communicate with the technician.

Since each rack controller 30 has a large display 46, a technician can easily read information by viewing the various rack controller 30. This arrangement also enables technicians to receive paperless work orders. If a work order is desired for a particular telecommunications closet, that work order can be read to the telecommunications closet, via a remote computer 56. A technician can then read that work order directly from the displays 46 of the rack controllers 30 when at the telecommunications closet. If a technician alters the telecommunications closet in a manner not corresponding to the work order, an error message can be automatically displayed to the technician. The same error message can also be sent back to the remote computer 56.

Since the present invention system contains a rack controller, that can be mounted to an existing telecommunications rack, and tracing interface modules, that can be mounted to existing patch panels, it should be clear that the present invention system can be retroactively added to many different types of telecommunication patch systems. The rack controller is sized to mount in existing racks. The tracing interface modules are designed with very thin profiles. Accordingly, when added to existing patch systems, the components of the present invention are added to an existing patching system, the added components do not require any physical changes to the layout of the telecommunications closet of the position of the patch panels on the racks within that closet.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. A telecommunications patching system, comprising:
   at least one rack structure;
   a plurality of connector ports supported by each said rack structure;
   a plurality of patch cords for selectively interconnecting different pairs of connector ports;
   sensors disposed at said connector ports for detecting the presence of a patch cord in each of said connector ports;
   a plurality of tracing interface modules that selectively attach to said rack structure, wherein said sensors are contained within said tracing interface modules; and
   a controller attached to each said rack structure, said controller being coupled to all said sensors on that rack structure, wherein said controller contains a remote access connector that enables said controller to be accessed from a remote location via a telecommunications link, thereby enabling a person at a remote location to ascertain the presence and absence of patch cords in each of said plurality of connector ports.

2. The system according to claim 1, wherein said telecommunications patch system contains a plurality of rack structures, each having its own controller, wherein each of said controllers are interconnected in a common network that is accessible via said telecommunication link.

3. The system according to claim 1, wherein each said controller contains an interface protocol that enables said controller to be accessed from a remote location over the internet.

4. The system according to claim 1, further including a remote computer coupled to said at least one controller.

5. The system according to claim 1, further including a handheld access interface coupled to said at least one controller for accessing said at least one controller at the location of said at least one controller.

6. The system according to claim 1, wherein each said controller contains a display capable of displaying information to a person viewing said controller.

7. The system according to claim 1, further including a plurality of patch panels attached to each rack structure, wherein said connector ports are located on said patch panels.

8. The system according to claim 7, wherein the plurality of tracing interface modules selectively attach to said plurality of patch panels.

9. The system according to claim 8, further including a plurality of lights contained within said tracing interface modules, wherein at least one light is associated in position with each of said plurality of connector ports and each of said lights is coupled to said at least one controller.

10. A telecommunications patching system, comprising:
    at least one rack structure;
    a plurality of connector ports supported by each said rack structure;
    a plurality of patch cords for selectively interconnecting different pairs of connector ports;
    sensors disposed at said connector ports for detecting the presence of a patch cord in each of said connector ports;
    a controller attached to each said rack structure, said controller being coupled to all said sensors on that rack structure, wherein said controller contains a remote access connector that enables said controller to be accessed from a remote location via a telecommunications link, thereby enabling a person at a remote location to ascertain the presence and absence of patch cords in each of said plurality of connector ports;
    a plurality of patch panels attached to each rack structure, wherein said connector ports are located on said patch panels;
    a plurality of tracing interface modules that selectively attach to said plurality of patch panels, wherein said sensors are contained within said tracing interface modules; and
    a plurality of lights contained within said tracing interface modules, wherein at least one light is associated in position with each of said plurality of connector ports and each of said lights is coupled to said at least one controller, wherein each of said lights can be remotely activated through said at least one controller, via said telecommunications link.

11. The system according to claim 1, wherein each of said sensors is a mechanical switch that detects a patch cord when the patch cord is present within a connector port.

12. A method of ascertaining the status of patch cord connector ports in a telecommunications closet, comprising the steps of:
    providing at least one tracing interface module having at least one sensor contained therein wherein the at least one tracing interface module is selectively attachable to the patch cord connector ports in the telecommunications closet, wherein said sensors are capable of detecting whether each patch cord connector port has a connected status;
    coupling each said sensor to at least one controller, wherein said at least one controller logs the status of each patch cord connector port; and
    reading the status of each patch cord connector port from said at least one controller.

13. The method according to claim 12, wherein said step of reading the status of each patch cord connector port includes accessing said at least one controller from a remote location via a telecommunications link.

14. The method according to claim 12, wherein said step of reading the status of each patch cord connector port includes accessing said at least one controller from a remote location over the internet.

15. The method according to claim 12, further including the step of connecting said at least one controller to a remote computer.

16. The method according to claim 15, further wherein said step of reading the status of each patch cord connector port includes accessing said remote computer from a remote location via a telecommunications link.

17. The method according to claim 12, wherein said step of providing sensors at each of the patch cord connector ports in the telecommunications closet, includes mounting sensors in front of each of said patch cord connectors.

18. The method according to claim 17, wherein said sensors are mechanical switches that physically detect the presence of a patch cord within a patch cord connector port.

19. A method of determining available connector ports in a telecommunications patching system having a plurality of connector ports, comprising the steps of:
    selectively attaching at least one tracing interface module to the plurality of connector ports, wherein the at least one tracing interface module has at least one sensor contained therein;
    monitoring each connector port in said telecommunications patching system with at least one controller, wherein said at least one controller automatically identifies which of said connector ports is not in use; and
    accessing said at least one controller from a remote location to determine the availability and position of connector ports not in use.

20. The method according to claim 19, wherein said step of monitoring includes the substeps of:

provIding a sensor at each connector port that detects when the connector is empty; and coupling each said sensor to said at least one controller, wherein said at least one controller automatically identifies which of said connector ports is not in use; and accessing said at least one controller from a remote location to determine the availability and position of connector ports not in use.

21. A method of issuing paperless work orders to a technician maintaining a telecommunications patching system, comprising the steps of:

monitoring each connector port in said telecommunications patching system with at least one controller;

generating a work order for the technician at a location remote from said telecommunication patch system;

sending said work order to said telecommunications patch system, wherein said work order is displayed on an electronic display; and monitoring the performance of the technician executing said work order from a remote location via said at least one controller.

22. The method according to claim 21, wherein said electronic display is disposed on each said controller.

23. An existing telecommunications patching system including a patch panel, and at least one rack structure, comprising:

a plurality of connector ports supported by each said rack structure;

a plurality of patch cords for selectively interconnecting different pairs of connector ports;

a tracing interface module containing sensors disposed at said connector ports for manually detecting the presence of a patch cord in each of said connector ports and wherein said module is suitable to be retrofitted to an existing patch panel for patch cord detection;

a controller suitable to be retrofittably interconnected to each said rack structure, said controller being coupled to all said tracing interface modules on that rack structure, wherein said controller contains a remote access connector that enables said controller to be accessed from a remote location via a telecommunications link, thereby enabling a person at a remote location to ascertain presence or absence of patch cords in each of said plurality of connector ports.

24. A method of ascertaining the status of patch cord connectors in an existing telecommunications closet, comprising the steps of:

providing sensors as part of a retrofit interface structure which is located over each of the patch cord connectors in the telecommunications closet, wherein said sensors are capable of detecting whether each patch cord connector has a connected status;

coupling each said sensor to at least one controller, wherein said at least one controller logs the status of each patch cord connector; and reading the status of each patch cord connector from said at least one controller.

25. A method of determining available connector ports in an existing telecommunications patching system having a patch panel and patch cords, comprising the steps of:

positioning a retrofit interface structure having sensors positioned in alignment with connector ports in said patch panel so as to detect the presence or absence of said patch cords;

monitoring each connector port in said telecommunications patching system with at least one controller, wherein said at least one controller automatically identifies which of said connector ports is not in use; and accessing said at least one controller from a remote location to determine the availability and position of connector ports not in use.

\* \* \* \* \*